(12) United States Patent
O'Neal (10) Patent No.: US 7,906,181 B2
(45) Date of Patent: Mar. 15, 2011

(54) METHOD FOR APPLYING CHEMICAL COATINGS

(75) Inventor: Hubert R. O'Neal, Georgetown, TX (US)

(73) Assignee: TMC-IP, LLC, Houston, TX (US)

(*) Notice: Subject to any disclaimer, the term of this patent is extended or adjusted under 35 U.S.C. 154(b) by 0 days.

(21) Appl. No.: 12/706,359

(22) Filed: Feb. 16, 2010

(65) Prior Publication Data

US 2010/0151140 A1    Jun. 17, 2010

Related U.S. Application Data

(63) Continuation of application No. 11/161,693, filed on Aug. 12, 2005, now abandoned, which is a continuation of application No. 11/161,694, filed on Aug. 12, 2005.

(51) Int. Cl.
*B05D 1/38* (2006.01)
*B05D 1/36* (2006.01)
*B05D 1/02* (2006.01)

(52) U.S. Cl. ............... 427/402; 427/299; 427/385.5; 427/407.1; 427/407.3; 427/408; 427/409; 427/410; 427/412.4; 427/416; 427/417; 427/418; 427/419.1; 427/421.1; 427/422

(58) Field of Classification Search .......... 427/299, 427/385.5, 402, 409, 407.1, 407.3, 408, 410, 427/412.4, 416, 417, 418, 419.1, 421.1, 422
See application file for complete search history.

(56) References Cited

U.S. PATENT DOCUMENTS

| | | | |
|---|---|---|---|
| 1,397,103 A | 11/1921 | Langfeldt |
| 2,579,610 A | 12/1951 | Pitre |
| 2,602,752 A | 7/1952 | Francis |
| 2,838,419 A | 4/1954 | Francis |
| 3,042,545 A | 7/1962 | Kienle et al. |
| 3,552,996 A | 1/1971 | Cass |
| 3,561,047 A | 2/1971 | McInnis |
| 3,619,224 A | 11/1971 | Inamoto et al. |
| 3,792,681 A | 2/1974 | Jones et al. |
| 4,215,797 A | 8/1980 | Chen |
| 4,393,106 A | 7/1983 | Maruhashi et al. |
| 4,455,474 A | 6/1984 | Jameson et al. |
| 5,043,373 A | 8/1991 | Hegedus et al. |
| 5,052,337 A | 10/1991 | Talcott et al. |
| 5,112,912 A | 5/1992 | Nikles |
| 5,171,613 A | 12/1992 | Bok et al. |
| 5,194,464 A | 3/1993 | Itoh et al. |
| 5,472,661 A | 12/1995 | Gay |
| 5,505,777 A | 4/1996 | Ciardella et al. |
| 5,785,760 A | 7/1998 | Sconyers et al. |
| 5,891,919 A | 4/1999 | Blum et al. |

(Continued)

FOREIGN PATENT DOCUMENTS

DE         19946613         12/2001

(Continued)

OTHER PUBLICATIONS

English Translation of DE 19946613 (Timmer), Dec. 7, 2001.

(Continued)

*Primary Examiner* — Elena T Lightfoot
(74) *Attorney, Agent, or Firm* — Conley Rose, P.C.

(57) ABSTRACT

A method of anti-fouling a metal structure disposed in water, the method comprising providing a clean surface on the metal structure, applying a tie coat to the surface, and applying a thermoplastic top coat to the tie coat.

21 Claims, 1 Drawing Sheet

U.S. PATENT DOCUMENTS

| | | |
|---|---|---|
| 6,488,773 B1 | 12/2002 | Ehrhardt et al. |
| 6,590,070 B1 | 7/2003 | Toriumi et al. |
| 7,259,115 B2 | 8/2007 | Panse |
| 2002/0129767 A1 | 9/2002 | Czerwonka |
| 2004/0129597 A1 | 7/2004 | Fregonese et al. |
| 2004/0163588 A1 | 8/2004 | Arvin et al. |

FOREIGN PATENT DOCUMENTS

| | | |
|---|---|---|
| GB | 1409048 | 10/1975 |
| JP | 2000037658 | 2/2000 |

OTHER PUBLICATIONS

English Translation of JP 2000037658 (Inoue et al.), Feb. 8, 2008.

METHOD FOR APPLYING CHEMICAL COATINGS

CROSS-REFERENCE TO RELATED APPLICATIONS

The present application is a continuation of U.S. patent application Ser. No. 11/161,693 filed Aug. 12, 2005, entitled "Method for Applying Chemical Coatings, and is a continuation of U.S. patent application Ser. No. 11/161,694 filed Aug. 12, 2005, entitled "Apparatus for Applying Chemical Coatings", all hereby incorporated herein by reference.

FIELD OF THE INVENTION

The present invention relates to chemical coating technology and more particularly to methods for applying thermoplastic coatings and still more particularly to a method for coating surfaces exposed to sea wash with an anti-fouling coating.

BACKGROUND OF THE INVENTION

Coatings are applied to various surfaces to protect the surface. For example, coatings are used to waterproof and insulate and to prevent corrosion, rust, rot, water damage, fouling, burning, as well as other types of deterioration and damage to a surface. The surfaces may include, but are not limited to, metal, wood, concrete or a synthetic, such as composites, tile, foam, fiberglass, PVC, plastic or the like, as for example. The surface may be the surface of a vehicle, piping, tubing, a vessel, furniture, caskets, structures (such as flooring, roofing, decking, etc.) to name a few. It is important that the coatings are effective, are inexpensive to apply and maintain, and have an extended lifetime.

In one application of coatings, surfaces exposed to sea wash or water containing marine organisms are susceptible to fouling. For example, the hull of a ship is designed to cut through the water with minimal resistance for maximum efficiency of the wind or mechanical power driving the vessel. In addition to a hydrodynamic design, the hull should be clean and smooth. However, with time (often relatively quickly), the hulls of ships or other exposed surfaces become fouled by all types of organic and inorganic material, i.e., the attachment of organisms to the exposed surfaces. Other structures exposed to water may also become fouled. Barnacles, bryozoans, mollusks, mussels, annelids, tunicates, algae, slimes and hydroids make up the most common type of fouling marine organisms.

The consequences are significant. Fouling causes the once smooth hull to become extremely rough, promoting corrosion, weakening the hull, eventually decreasing the ships maneuverability and increasing drag. The domino effect is obvious—fuel consumption is increased (in some cases by as much as 30%), which causes both economic (e.g., increased fuel costs) and environmental consequences (e.g., increased greenhouse gases). Not surprisingly, a significant amount of attention has been devoted to this problem.

Historically, one solution was to frequently scrape or blast the hull clean to remove the fouling. However, this cumbersome process is time consuming and costly. In addition, frequent scraping of the hull can result in weakening the hull. The most widely accepted method of controlling and/or preventing fouling is to apply some type of anti-fouling coating on the surfaces. Common anti-fouling coatings contain amounts of metals, e.g., copper, aluminum or tin, which the organisms find distasteful, even toxic. As an added benefit, the coatings also prevent corrosion.

Anti-fouling compositions have been known for years. Although such anti-fouling compositions are an improvement, they do not represent a perfect solution. Several problems exist today, e.g., applying the coating evenly, difficulty in handling the material, the need for an efficient, consistent and durable apparatus for applying the materials, and the fact that the coatings are notorious for their inability to adhere to the surfaces. For example, U.S. Pat. No. 2,602,752 discloses an anti-fouling composition designed by the U.S. Navy to prevent the fouling of the hulls of vessels. In fact, the composition developed in U.S. Pat. No. 2,602,752 achieved minimal success because of the difficulty of the coating adhering to the metal ship hulls and because of the difficulty in achieving an even, smooth, homogenous coating. This is in part due to the high solids content. The material described in U.S. Pat. No. 2,602,752 has essentially a solids content of essentially 100%. Paint typically has a solids content of about 50-60% and other anti-fouling compositions have a solids content of about 60-75%.

In addition, the anti-fouling chemicals and spray technology required high handling temperatures, e.g., greater than or equal to about 300° F., to reduce viscosity and keep the material fluid. These high temperatures create difficult equipment and handling requirements. New problems have also emerged.

The anti-fouling coatings on the market today leach toxic metal compounds into the water. The high leaching of toxic metal compounds over short periods of time unnecessarily contaminates the water. Regulatory agencies are seeking to limit the amount of leaching that can take place over a specified period of time, e.g., for the metal copper, regulations in Sweden require less that 55 μg/cm$^2$/day, Canada requires less than 40 μg/cm$^2$/day. In addition, high leaching results in a shorter lifetime of the coating, i.e., once the toxic chemicals have been leached away, the coating will no longer be a deterrent to fouling organisms. Accordingly, coatings with a slower but effective leach rate can provide the added benefit of longer and extended lifetimes.

Further, the lifetime of coatings on the market today is relatively short in that ships have to be dry docked for cleaning at a frequency of about every 18 months. The process currently utilized for applying anti-fouling coatings requires having the ship in dry dock for weeks. Generally, the process involves about one day to blast the hull clean, at least one day to prime the hull, several days for the primer to completely dry, followed by a minimum of two weeks to coat the hull with the anti-fouling paint. Five to six coats are necessary and each coat involves about one day for application and about two days for drying. Every day represents a significant loss for the ship owner in that they are paying to be in dry dock and losing money due to the ship being out of commission.

In addition, the organic compounds present in the prior art anti-fouling coatings pose a pollution problem and they require volatile organic compounds (VOC) to assist in application and drying.

At present, two significant areas of interest with respect to using anti-fouling coatings remain i.e., how to achieve a better bond between the coating and the metal surface and more efficient and productive means for applying the coatings, particularly at higher temperatures. Accordingly, improvements need to be made in the field. The present invention addresses the deficiencies of the prior art discussed above.

SUMMARY OF THE PREFERRED EMBODIMENTS

The present invention is directed to a method for applying anti-fouling coatings and still more particularly to a method for coating surfaces exposed to sea wash with a multi-layered, anti-fouling coating. The method of the present invention is equally applicable to other applications in which the coatings are useful, such as a fire retardant or anti-corrosion coating. Accordingly, although the preferred embodiments discuss coating surfaces exposed to marine organisms, other applications are contemplated and within the spirit of the invention.

Preferably the process for coating a surface of the present invention includes the steps of cleaning the surface, applying an undercoat or tie coat to the cleaned surface, and finally applying a top coat or outer coat that contains the anti-fouling compounds. Suitable surfaces include, but are not limited to metal, wood, foam, fiberglass, plastic and combinations thereof. The preferred tie coat comprises a two-part epoxy including a curing agent and a resin. Application of the tie coat is carried out at ambient conditions directly onto the clean metal using a spray technique. The tie coat bonds to the surface and preferably is applied so as to achieve a total dry layer thickness of about 3-4 mils on the surface. Before complete curing of the tie coat, the outer coat or top coat is applied. Depositing the outer coat onto the tie coat prior to full cure of the tie coat allows the two coatings to interact and/or react at their interface to create a strong bond to the surface as compared to applying the anti-fouling coating directly to the surface.

The top coat comprises the anti-fouling chemical compounds. Because the preferred top coat is a thermoplastic and thus generally a solid at ambient temperatures and only has reduced viscosity at high temperatures, application of the top coat requires a higher handling temperature than the tie coat. The preferred temperature is a function of the particular chemical composition (e.g., melt temperature and viscosity) of the anti-fouling coating and/or the ambient conditions under which the coating is being applied. The temperature of the top coat also affects the curing and/or reaction rate of the tie coat. The preferred thermoplastic top coat must be preheated to a temperature greater than or equal to 140° F. to become fluid, more preferably the temperature is greater than or equal to 175° F.

The anti-fouling top coat is a mixture of different compounds, including but not limited to metal compounds, sulfides, gums, rosins, various waxes and other inert materials such as pigments. The preferred top coat is described in U.S. Pat. No. 2,602,752. The top coat is preferably applied to achieve a total layer thickness of between 20 mils and 30 mils. Preferably, the top coat is applied in layers of about 5 to 10 mils per layer, until the desired final thickness is achieved.

The coating process of the present invention has many advantages. The tie coat creates a stronger bond with the metal surface and top coat resulting in more adherent coatings. Using the tie coat also allows for faster drying times and less time needed between applications of multiple coats. Thus, down time or time in dry dock is significantly reduced because the process takes a matter of hours or days as opposed to weeks or months, which reduces cost and increases the time the vessel is in commission. The low time requirements associated with the process allow for easier handling and greater flexibility in the equipment used. The tie coat also waterproofs the hull, preventing corrosion and other damage.

Another preferred embodiment of the present invention comprises applying an anti-fouling coating using an apparatus as described herein. The preferred embodiment comprises applying the coating using a fully temperature controlled system including a solids processor, a liquid processor and a liquid applicator. The solids processor comprises one or more means for heating a thermoplastic chemical mixture that is solid at room temperature such that it is flowable through a temperature controlled conduit or hose into the liquid processor. Liquid processing is carried out in a temperature controlled, heat jacketed vessel that includes means for maintaining the mixture homogenous. The heat jacket provides the heat needed to maintain the composition in the liquid phase. Temperature regulated pump stations or stands are used to transfer the homogenous mixture from the liquid processor through temperature controlled and heated hoses to the liquid applicator for applying a uniform coating of the homogenous liquid mixture onto the surface. The preferred liquid applicator pressurizes the liquid coating causing the top coating to flow through heated hoses and spray guns to spray the top coat onto the curing tie coat previously applied to the cleaned surface.

The preferred embodiments of the present invention further comprise means for maintaining the metal compounds in the thermoplastic top coat in suspension throughout the process of preparing and applying the top coat. The liquid processor continuously agitates the top coat to prevent the metal compounds from precipitating out of the liquid mixture of the top coat. Further, the liquid applicator also continuously mechanically shears the top coat as it flows from the liquid processor, through the pump stations, to the spray gun so as to apply a homogenous suspension of the metal compounds in the coating onto the tie coat on the surface.

The method disclosed herein comprising an apparatus in accordance with the present invention has several advantages. The unique design combines thermoplastic technology with finishing technology, preventing the metal anti-fouling agents from precipitating out of the top coat and allowing the top coat to be applied like a finishing paint. In other words, the top coat can be applied uniformly and consistently with respect to both the physical thickness of the deposited coating and the chemical distribution throughout the coating (i.e., more homogenous coatings). The relatively small size of the equipment needed allows for a more mobile process.

Another preferred embodiment for applying an anti-fouling thermoplastic coating comprises heating an anti-fouling mixture to maintain the mixture as a liquid, agitating the liquid, and applying the agitated liquid to a surface that has been primed by a tie coat.

BRIEF DESCRIPTION OF THE DRAWINGS

Other objects and advantages of the invention will appear from the following description.

For a detailed description of a preferred method and apparatus embodiments of the invention, reference will now be made to the accompanying FIGURE, which shows a temperature controlled system for applying an anti-fouling thermoplastic coating in accordance with the present invention.

While the invention is susceptible to various modifications and alternative forms, specific embodiments thereof are shown by way of example in the drawings and will herein be described in detail. It should be understood, however, that the drawings and detailed description thereof are not intended to limit the invention to the particular form disclosed, but on the contrary, the intention is to cover all modifications, equivalents and alternatives falling within the scope of the present invention as defined by the appended claims.

DESCRIPTION OF PREFERRED EMBODIMENTS

The present invention is directed to a method for applying thermoplastic coatings and still more particularly to a method for coating surfaces exposed to sea wash with an anti-fouling coating. In the preferred embodiment, the present invention will be described for use on surfaces that are exposed to marine organisms or sea wash. The invention, however, has other known uses such as an insulation, anti-corrosion material and fire-retardant material. The end uses are not considered critical to the invention unless specifically claimed in a particular embodiment. Rather, the process and related apparatus described and claimed are considered applicable to any particular end use that requires or would benefit from the coating.

Several embodiments also include using an apparatus for applying a thermoplastic coating. The preferred apparatus comprises a fully temperature controlled system including a solids processor, a liquid processor and a liquid applicator. The system maintains the metal compounds in the thermoplastic coating in suspension throughout the process to provide a homogenous coating onto the surface and maintains the temperature of the coating to allow the coating to be applied like a finishing material. The result is a thermoplastic top coat which adheres to the tie coat and is applied uniformly over the surface.

Thus, the present invention relates to methods and apparatus for applying thermoplastic coatings. There are shown specific embodiments of the present invention with the understanding that the present disclosure is to be considered an exemplification of the principles of the invention, and is not intended to limit the invention to that illustrated and described herein. In particular the methods and related apparatus of the present invention will be described for use in applying an anti-fouling coating to marine surfaces. However, the present invention is not limited to that application and the present invention is susceptible to embodiments of different forms. Likewise, unless specifically stated, the order of steps is not considered critical. The different teachings of the embodiments discussed below may be employed separately or in any suitable combination to produce desired results.

The following definitions will be followed in the specification. As used herein, the terms "tie coat" and "undercoat" are used interchangeably. Likewise, the terms "top coat" and "outer coat" are also used interchangeably herein. Unless specifically stated otherwise, references herein to "surface" refer to the surface of the substrate or surface that is to be coated and not the outer surface of the coating once deposited. The term "anti-fouling" refers to the ability to prevent fouling, preferably preventing the build-up of deposits such as barnacles and other marine organisms on a ship's bottom. The term "anti-fouling" may also be used in a generic sense to characterize the top coat or the combination of the tie coat and top coat as a product. As used herein, the term "finishing technology" implies the use of a finishing material, typically a paint, that can be applied to a surface uniformly at temperatures equal to or less than about 150° F. and also includes the methods and equipment, such as spray equipment, to apply the finishing material uniformly onto a surface at temperatures equal to or less than about 150° F. As will be understood by those skilled in the art, a "toxic chemical" is any chemical that prevents the build-up of marine organisms either by physical (prevent attachment) or biological (killing), these are preferably metal compounds that are known in the industry, examples of which are provided herein. "Day tank" may be used to refer to any holding tank. "Heat traced" is a flexible conduit or hose which is temperature controlled along its length. "Thermoplastic" should be interpreted as broadly as the general definition in the art allows and specifically includes, but is not limited to, chemical mixtures that are a solid at ambient temperatures and include waxes that can melt or bend when heated but become rigid when cooled and which can melt or bend when re-heated. The term "plastic" in thermoplastic refers to the pliability of the material at a particular temperature and does not mean that the material includes a plastic.

In the description that follows, like parts are marked throughout the specification and drawings with the same reference numerals, respectively. The drawing FIGURES are not necessarily to scale. Certain features of the invention may be shown in exaggerated scale or in schematic form and some details of conventional elements may not be shown in the interest of clarity and conciseness.

The preferred embodiments for the present invention includes a method for applying thermoplastic coatings on a selected surface and related systems for applying said coatings. Preferably the method or process for coating a surface includes the steps of cleaning the surface (if necessary), applying an undercoat or tie coat and finally applying a thermoplastic top coat or outer coat that more preferably contains anti-fouling compounds. It will be understood that a new surface may or may not need to be "cleaned." In general, "cleaning" is relative to the surface and the condition that the surface presents at the time for coating. A new surface may need only to be wiped clean or have performed some other means of removing loose dust or debris, e.g., simple air cleaning or rinsing of the surface. Other surfaces may require a thorough washing. In applying anti-fouling coatings, surfaces that have been bio-fouled, e.g., have organisms attached to the surface, will need to have the organisms and other fouling materials scraped or otherwise removed. Sandblasting is an effective way to clean some metal surfaces; however, this practice is largely prohibited with respect to ship hulls and has been replaced with water- or dry ice-blasting.

The method of cleaning may also be largely dependent upon the type of surface that is to be coated. It will be understood by those of ordinary skill in the art that the surface to be coated is not critical to the present invention except that it is certainly a factor to be considered when selecting a suitable cleaning method. Suitable surfaces include, but are not limited to metal, wood, composites, foam, fiberglass, plastics and combinations thereof.

After cleaning the surface (if needed), a tie coat is applied. Application of the tie coat is preferably deposited directly onto a clean dry surface. Spray coating the tie coat onto the surface is the preferred method of deposition. The tie coat may be applied in one or more layers, preferably only one layer, for a preferred total dry layer thickness of 5 mils or less, still more preferably between 3 and 4 mils.

The preferred tie coat comprises an epoxy. The epoxy tie coat reacts or interacts with the top coat to achieve a bond with the surface, providing flexibility and thermal stability to the overall coating and increasing the waterproofing capabilities of the overall coating. Epoxy chemistry and compositions are well known in the art. The preferred epoxy of the present invention comprises a two part epoxy—having at least a curing agent and a resin. The more preferred epoxy is an epoxy that comprises a bisphenol resin and even more preferred epoxy comprises a bisphenol-A type resin.

In one preferred embodiment of the present invention, the tie coat is an epoxy comprised of an oligomeric polyamine curing agent and a polymer resin. The polymer resin includes 75% wt. phenol, 4,4'-(1-methylethylidene)bis-polymer with 2,2'-[(1-methylethylidene) bis(4,1-phenylene oxymethylene)] bis[oxirane] and 25% wt. solvent (comprised primarily of xylene with small amounts of benzene). Specifically, this curing agent and resin are sold commercially as EPIKURE™ Curing Agent 3164 (also known as EPI-CURE™ 3164) and EPON™ Resin 1001-X-75 (also known as EPI-REZ™ Resin 2136). Both of these components are sold by Resolution Performance Products. This epoxy formulation provides uniform and consistent coatings that have a high degree of toughness and flexibility combined with excellent chemical and corrosion resistance. In particular, epoxies that include aromatic rings help prevent shrinking to avoid cracking and allow for more flexibility in the cured coating. The epoxy forms a strong bond to the surface and to the preferred top coat.

Application of the tie coat is preferably accomplished using spray technology. Regardless of the deposition method, it is preferred that the epoxy components (curing agent and resin) are mixed prior to deposition. Generally, upon initial mixing, epoxies are fluid under ambient conditions. The temperature need only be warm enough to have the epoxy in the form of a fluid so that it can be easily applied, preferably sprayed. However, once mixed, the epoxy will immediately begin to cure creating a "pot life" or "gel time." If not used quickly, the epoxy will cure and harden in the container or pot in which it is contained. Thus, it is preferred that the tie coat be applied (e.g., sprayed) within a certain time period to assure that it is in a liquid form and does not harden or set up in the pot. As will be understood by those of ordinary skill, the pot life can be manipulated to some degree by adjusting the ratio of curing agent to the resin used. However, if the ratio drifts too far from stoichiometric, the cure may not be complete. It is preferred that the pot life of the epoxy be long enough to allow the application of the epoxy to the surface and more preferably at least a pot life of about 60 minutes.

The top coat is a thermoplastic and includes anti-fouling chemical compounds. The top coat or anti-fouling coat is a mixture of different compounds, including but not limited to metal compounds, sulfides, gums, rosins, various waxes and other inert materials such as pigments. The particular anti-fouling composition is not critical to the present invention; however, the composition preferably contains amounts of metals, e.g., copper, aluminum or tin, which the organisms find distasteful, even toxic.

Although epoxies have been used as primers in certain coating applications, their use has been as a primer for applying finishing materials such as paints. Paints are toxic to the environment as a whole and are not solid at room temperature, i.e., paints can be sprayed on at room temperature. The elevated temperatures required by the thermoplastic compositions of the present invention require additional consideration to the potential curing problems, adherence concerns, chemical interactions and long term durability of the coatings that are deficiencies in the prior art.

The preferred thermoplastic, anti-fouling composition of the present invention is described in U.S. Pat. No. 2,602,752, hereby incorporated herein by reference in its entirety. Accordingly, the anti-fouling composition for the present invention comprises:

|  | Range (wt %) | Preferred (wt %) |
| --- | --- | --- |
| Gum rosin | 36.67 to 41.67 | 41.67 |
| Paraffin wax | 4.44 to 8.00 | 4.44 |
| Ceresine wax | 2.38 to 4.55 | 2.38 |
| Copper linoleate | 13.64 to 24.0 | 13.64 |
| Cuprous oxide | 32.46 to 37.8 | 32.46 |
| Inert pigment (abestine) | 0 to 5.41 | 5.41 |

The wax constituents (in particular, the paraffin wax) help reduce the viscosity of the composition to a suitable spraying consistency when heated. In addition, the waxes provide a more flexible film or coating. The gum rosin functions as a binding ingredient. The cuprous oxide is the toxic agent. Magnesium silicate (abestine) promotes better suspension and improves the leaching action of the composition. Accordingly, this preferred anti-fouling composition has substantially a 100% solids content at room temperature. The preferred anti-fouling compositions of the present invention comprise a solids content of greater than or equal to about 75% at room temperature. Consequently, the preferred anti-fouling coatings are substantially free of VOC problems. The preferred anti-fouling compositions of the present invention comprise a VOC content of less than or equal to about 2%, and preferably less than or equal to about 1%.

This preferred anti-fouling composition for the coating of the present invention has a preferred average leaching rate of less than or equal to about $10\,\mu g/cm^2/day$ and more preferably less than or equal to about 3 $\mu g/cm^2/day$, a significant improvement over prior art coatings. The average leaching rate is determined in accordance with ASTM D6442-03. Thus the preferred top coating has an extended life compared to the prior art and will be effective for a longer time as an anti-fouling agent because of its long life in leaching metal compounds which are toxic to the water organisms.

The thermoplastic composition for the top coat is a solid at ambient temperatures. Therefore application of the preferred top coat requires higher handling temperatures than the undercoat. The preferred temperature is a function of the melt temperature and viscosity of the thermoplastic composition and/or the ambient conditions under which the application of the top coat takes place. The temperature of the preferred top coat also affects the curing and/or reaction/interaction rate of the tie coat at its interface with the top coat. Preferably, the preferred top coat is initially preheated to a temperature of greater than or equal to 140° F., more preferably greater than or equal to 175° F., to achieve flowability of the preferred thermoplastic top coat. Prior to application, the temperature of the preferred top coat is raised to achieve a viscosity allowing the top coat to be applied like a finishing material, such as paint, i.e., greater than or equal to 250° F. and as a high as 325° F. This high temperature allows the top coat to achieve a top coat viscosity that allows it to be homogenously mixed just before deposition, keeps it fluid for ease of application, and allows for a uniform, even spray pattern, avoiding the top coat from being applied so as to form globules on the surface or to sag under gravitational force.

The outer coat or top coat is preferably applied before total curing of the tie coat. Depositing the outer coat prior to full cure of the tie coat allows the two coatings to interact and/or react at their interface to create a strong bond between each other and thus to the hull, as distinguished from using an anti-fouling paint alone. Although the tie coat has a pot life of about one hour, full curing takes 12 hours or more. Thus, the top coat may be applied up to 12 hours after the tie coat is deposited on the surface, preferably less than or equal to about 10 hours, more preferably less than or equal to about one (1) hour, and still more preferably in a matter of minutes after the tie coat is applied. It is preferred, however, to apply the top coat only after the tie coat has cured to a tacky or sticky state.

The temperature of the top coat has a direct effect on the reaction or interaction rate of the top coat with the tie coat. Once the top coat is applied, the heat from the top coat will increase the curing rate of the tie coat and the tie coat will thus harden rapidly. The top coat has the ability to bond to the tie coat in about one hour and can be hard within a couple of hours. It is believed that by applying the top coat onto the tie coat before the tie coat is fully cured, that additional bonding (i.e., hydrogen, covalent and/or ionic bonding) takes place between the tie and top coats at their interface to form a stronger bond. Thus, the tie coat binds together with the top coat and the surface to provide adherence of the top coat to the surface. The top coat becomes hard within 24 hours. Thus, ships can be launched back into the water generally within one day of completing the coating of the ship's hull.

The top coat is preferably applied so as to have a total top coat thickness in the range of about 10 mils to about 40 mils, more preferably from about 20 mils to about 30 mils, and still more preferably a total top coat thickness of about 20 mils. Preferably, the top coat is applied in layers of about 5 to 10 mils per layer, until the desired final thickness is achieved. When applying layers of the top coat, each layer is allowed to cool before an additional layer is applied. However, the layer need not be fully cooled or cured. It is preferred that a layer is allowed to cool for about 15 minutes, preferably about 30 minutes before an additional layer is applied. However, it should be appreciated that the actual time between application of layers will be dependent on existing weather conditions at time of application. For example in practice, a 100 square foot surface may be coated at a time. If only one sprayer is used, by the time a first coat is fully applied, the top coat may be sufficiently cool to begin applying a second coat.

Figure 1:
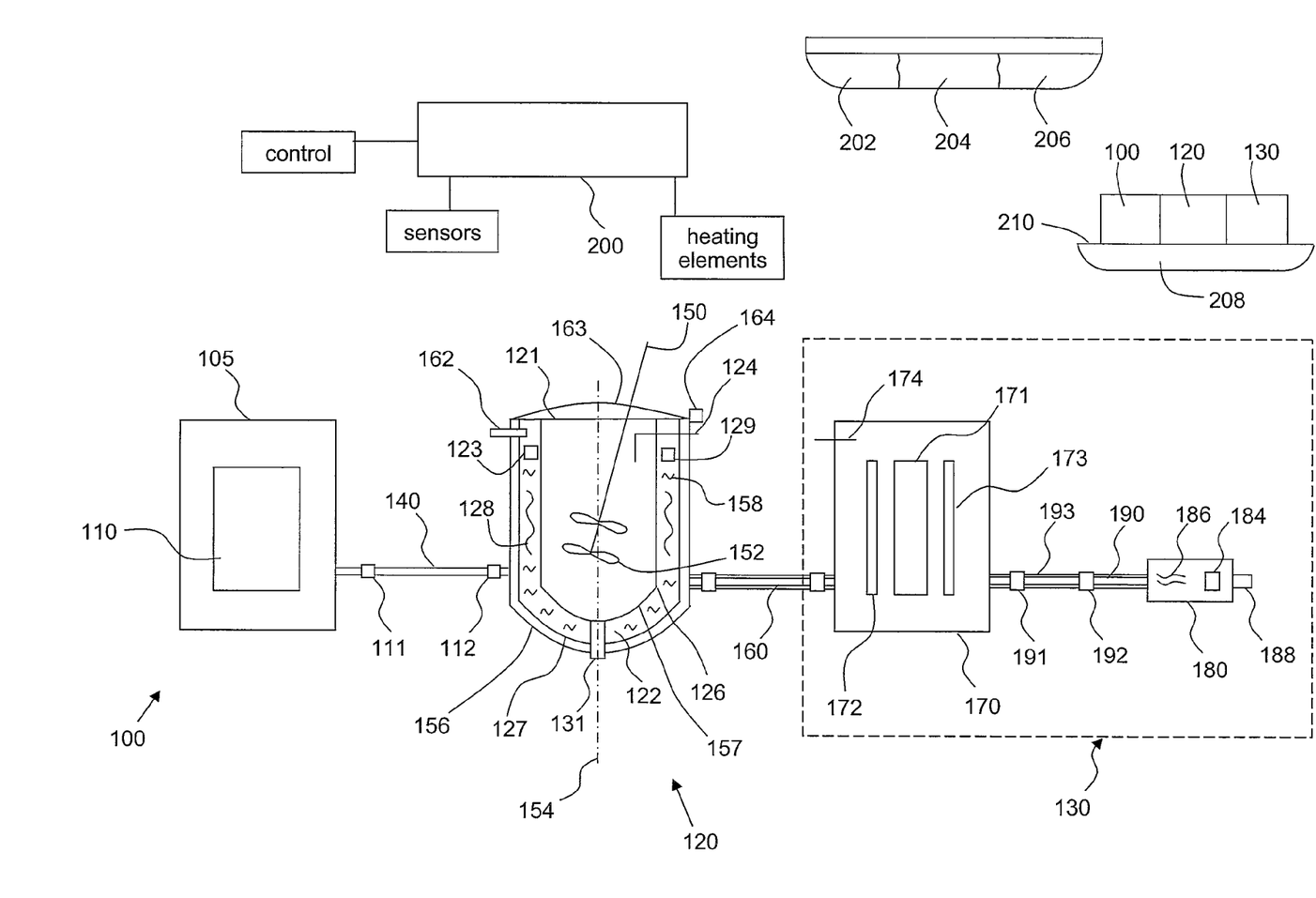

Another embodiment of the present invention includes using an apparatus or related system to apply a thermoplastic coating in accordance with the method described herein. The preferred embodiment generally comprises a thermoplastic stage assembly having solids processing components and a finishing stage assembly having liquid processing components and liquid applicator components or finishing assembly. Both the thermoplastic stage and the finishing stage assemblies are fully temperature controlled. Specifically referring to the FIGURE, a preferred embodiment of a fully temperature controlled system for applying a chemical coating is shown comprising a solids processing assembly 100 of the thermoplastic stage, and a liquids processing assembly 120 and a liquid applicator assembly 130 of the finishing stage.

The solids processing assembly 100 comprises means for liquefying a thermoplastic and/or anti-fouling composition such as by heating the composition to sufficiently melt the solid composition so that it is flowable. As previously mentioned, the preferred anti-fouling compositions are solids at ambient conditions. The solid composition may be stored or purchased as a solid 110, which can be wholly placed within the solids processing assembly such as drum unloader 105. Drum unloader 105 comprises means for heating the solid 110 such that the solid 110 is melted in the drum unloader 105. Drum unloader 105 may comprise any suitable off the shelf equipment capable of melting the solid anti-fouling composition.

The temperature in the drum unloader 105 is preferably high enough to reduce the a viscosity of the solid composition such that it becomes flowable. Suitable set temperatures for drum unloader 105 are typically in the range of about 140° F. to about 175° F., more preferably in the range of about 145° F. to about 150° F.

Temperatures in excess of that needed to render the solid composition flowable are undesirable. Thermoplastics, such as the preferred anti-fouling composition, have a degradation code. The higher the temperature, the greater the tendency of the thermoplastic to degrade. Thus it is preferred to keep the temperature in the drum unloader 105 at the minimum temperature required to provide the desired viscosity to flow the anti-fouling composition into the liquids processing assembly 120. The lower the temperature in the drum unloader 105, the smaller the tendency of the thermoplastic to degrade.

Once the solid anti-fouling composition is melted and flowable in the thermoplastic stage assembly 100, it is transferred to the liquids processing assembly 120 of the finishing stage assembly. The finishing stage assembly provides a flow passage to transport the top coat from the thermoplastic stage assembly to the surface being coated. The finishing stage assembly is completely temperature controlled to maintain the top coat in a preferred temperature range so that the top coat exits the finishing stage assembly as a finishing material and can be applied uniformly and consistently onto the surface. The finishing stage assembly also maintains the homogeneity of the top coat so that the top coat exits the finishing stage assembly with the metal compounds of the top coat uniformly dispersed throughout the top coat whereby the metal compounds can be applied uniformly and consistently onto the surface. The finishing stage assembly ensures that the top coat completely covers the surface with the metal compounds providing the anti-fouling and that the top coat is uniform and does not crack or peel.

A control panel 200 continuously monitors and provides commands to the thermoplastic stage assembly 100 and finishing stage assemblies 120, 130. The various components of the thermoplastic stage assembly 100 and finishing stage assemblies 120, 130 each have sensors and heating elements which are connected to the control panel 200. The control panel 200 includes means for processing the data received from the sensors and then means for sending commands to the heating elements to vary their temperature so as to maintain the top coat flowing through the flow passage within a preferred range of temperatures. For example if a sensor or thermocouple indicates that the top coat flowing through a particular component is below the preferred temperature range, the control panel 200 will command the applicable heating element to turn on until the top coat reaches a preferred temperature in the upper portion of the preferred temperature range.

It should also be appreciated that the various components of the thermoplastic stage assembly 100 and finishing stage assemblies 120, 130 may include other sensing means for sensing or measuring predetermined parameters relating to the system with such sensing means being connected to the control panel 200. For example, the various components may include flow meters to measure the flow rate or volume of the top coat flowing through a particular component or include pressure sensors to measure the fluid pressure of the top coat flowing through a particular component. Further the sensing means may be preferably located in a component to determine the suspension of the metal compounds in a particular component to ensure an adequate homogeneous anti-fouling composition. Still further, fluid levels in the liquids processing assembly 120 may be measured using appropriate sensors connected to the control panel 200.

The melted and flowable top coat is transferred from the drum unloader 105 to the liquids processing assembly, such as day tank 120, via a heat traced conduit or hose 140. Hose 140 is temperature controlled to assure that the thermoplastic composition remains flowable and that no solidification occurs in the transfer of material from drum unloader 105 to day tank 120. Controlling the temperature in and through hose 140 may comprise various sensors or thermocouples (e.g., 111, 112) located within or along hose 140 that are in communication with control panel 200. Although shown only as a single unit in the FIGURE, it should be appreciated that a plurality of drum unloaders 105 may be used so that flowable material can be continuously or nearly continuously fed into day tank 120 to meet the application requirements for the surface being coated. Likewise, a plurality of day tanks 120 may be used to provide a continuous homogenous feedstock to the liquid applicator assembly 130 to provide means for applying the liquefied top coating in the amounts required by the surface being coated.

The day tank 120 includes temperature control means 121 to maintain a sufficient temperature in the day tank 120 to achieve a viscosity of the thermoplastic anti-fouling top coat to finishing material form. The temperature control means 121 includes a heat jacket 122 around the day tank 120 to raise and maintain the temperature of the thermoplastic top coat to that of a finishing material. The top coat in day tank 120 is maintained at a temperature sufficient to achieve a material viscosity that allows for a flow rate to provide a constant head pressure of material to the pump stands 170, hereinafter described in detail. The temperature control means 121 of the day tank 120 also includes temperature controls (e.g., 123) that are in communication with the control panel. The temperature is preferably maintained within plus or minus 3 or 4 degrees. Suitable temperatures may depend on the composition of the material within day tank 120. Preferred temperatures for the day tank 120 are slightly higher than those for the drum unloader 105. In a preferred embodiment the temperature in day tank 120 comprises a range of about 245° F. to about 325° F., more preferably about 245° F. to about 275° F.

Day tank 120 is temperature controlled and agitated to maintain a homogenous mixture therein. Heating the material in day tank 120 to a more fluid viscosity allows for a more homogenous mixture. It is preferred that the anti-fouling mixture be as homogenous as possible in the day tank 120. The metal compounds in the anti-fouling mixture tend to settle or precipitate out of the liquid material. Thus, the material is continuously agitated using an agitation means 150 to keep the metal suspended in the top coat before the top coat is transported to be deposited on a surface. Agitator means 150 may be any suitable means for mixing and agitating the material to prevent the metal compounds from settling or precipitating out of the top coat. In a preferred embodiment, agitator means 150 comprises a plurality of paddles or propellers 152 that are motor driven 164 to mix and agitate the top coat. Preferably the propellers 152 are rotated at an angle to the axis 154 of the day tank 120.

Day tanks 120 may include a temperature monitoring device that flows constant energy to a heating element and then pulses energy to that heating element so that a desired temperature is achieved. High temperature RTDs (resistance temperature derivative) or thermocouples in the day tank 120 continuously monitor the temperature. These sensors preferably provide temperature feedback to the control panel 200.

In a preferred embodiment, day tank 120 is a cylindrical enclosure and has a clam shell opening 163 for inspection, maintenance, and cleaning of the tank 120. The day tank 120 preferably includes an inner metal tank 126 with an outer metal tank 127 forming an annular chamber 128 serving as a heat jacket 122. The outer metal tank 127 further includes an outer insulation 156. The annular chamber or jacket 122 around the inner tank 126 is filled with a heatable liquid 158, such as oil, to serve as a bath around the top coat in the inner tank 126. The oil level in the annular chamber may be manipulated via an inlet 162. Heating elements 128, such as electrical wires, extend through the heat jacket 122 to keep the oil heated, which in turn heats the liquid top coating in the inner drum 126. Sensors (e.g., 129) are placed in the annular chamber 122 to monitor the temperature of the oil. Thermocouples (e.g., 124) may extend into the top coat in the inner tank 126 to monitor the temperature of the top coat in the day tank 120. The heating elements 128, sensors 123 and thermocouples 124 are connected to or otherwise in communication with the control panel 200.

The top of the day tank 120 is preferably closed by a clamshell lid 163 with the shaft of the paddles 152 preferably projecting through the top of the day tank at an angle into the inner tank. The day tank 120 preferably has a dome bottom 157. Preferred embodiments also include one or more drains 131 in the bottom of day tank 120 to drain the inner tank 126 and jacket 122. There also may be ports 162 extending through the wall of the outer tank 127 to fill the annular chamber 122 with oil.

Temperatures may vary at different locations within the inner tank 126 of the day tank 120, particularly at the inlet (not shown) from the unloader drum 105, the exit (not shown) for the top coat from day tank 120, or at the drain 131 of the day tank 120. It is important that the temperatures of the top coat in the day tank 120 be continuously monitored to maintain the temperature of the exiting top coat within a given preferred range of temperatures, e.g., from about 250° F. to about 325° F. The control panel 200 may shut everything down if the top coat being drawn from day tank 120 is not within the preferred temperature range. It is important that the liquid top coating be maintained at the proper temperature because the top coating cannot be applied through the liquid applicator assembly 130 at too low a temperature at which the top coat does not properly bond with the tie coat or is not uniformly coated onto the surface.

The applicator assembly 130 includes a plurality of pump stands 170 and applicators 180 connected together by traced hoses 160 and 190. The pump stands 170, applicators 180, and hoses 160, 190 form that portion of the flow passageway transporting the top coat from the day tank 120 to the surface to be coated. These assemblies are temperature controlled to maintain the temperature of the top coat within a range of temperatures and provide means for maintaining the metal compounds suspended in the top coat. Such means include agitation and mechanical shearing of the top coat as it flows through the flow passageway.

The homogeneous top coat mixture is transported from day tank 120 further through the flow passageway via heat traced hoses 160 to temperature controlled pump stands 170. In a preferred embodiment, pump stands 170 include a tank 170 into which the top coat flows from the day tank 120. The pump stands include a pump 171 for drawing the top coat from the day tank 126 to the pump stand 170. The pump 171 pressurizes the top coat. Pump 171 may be any pump that can be temperature controlled. Heating elements or cartridges 172, 173 are disposed inside the pump tank 170 to maintain the temperature of the top coat within the preferred range of temperatures. Sensors 174 are also disposed in the pump stands to monitor the temperature of the top coat in the pump tank 170. The pump 171, heating elements 172, 173 and sensors 174 are connected or are otherwise in communication with control panel 200. The pump stands 170 are used to transfer the homogenous top coat mixture from the day tank 120 through additional heated hoses 160 to means for applying the top coat 202 to the tie coat 204 on the surface 206 to be protected. The preferred applicator means 180 includes temperature controlled spray guns 180 having spray nozzles 188 with the pressure created by the pump stands 170 being used to spray the coating onto the tie coat 204 on surface 206. The nozzles are preferably the same type nozzles used for applying finishing materials.

It is anticipated that a plurality of heat traced hoses 160 (e.g., temperature controlled hoses) may be connected to the day tank 120 to feed a plurality of spray guns 180 for applying the top coating. The day tank 120 serves as a buffer between the drum unloader 105 and the applicator assembly. This insures that the spray guns 180 are continuously served with top coating as a finishing material. It is preferred that the day tank 120 supply approximately 1 to 2 gallons per minute to approximately four spray guns 180 simultaneously. The day tank 120 provides the liquid top coating at the application temperature. Thereafter the pumps 171, heat traced hoses 160, 190, and spray equipment 180 maintain the top coat within the preferred temperature range.

The hoses 190 extend from the pump stands 170 to the spray guns 180. Hoses 190 include a Teflon liner or tube around which is wrapped a heat tape that includes a spiraling wire through which electricity flows to heat the hose and the liquid top coating passing through the inner liner. The hoses 190 may also include an embedded RTD sensors 191, 192 every 2 to 5 feet along the hose. The sensors measure the temperature at the location of the sensor and sends the temperature signal or measurement to control panel 200. The temperature along the section of hose 190 is averaged from the RTD sensor readings to maintain an average temperature within the preferred range for the liquid top coating. This allows the temperature of the liquid top coating to be maintained within a range of temperatures as it flows through the hoses 190.

The hoses 190 from the pump stands 170 to the spray guns 180 are preferably about 150 feet long to reach the surface from the day tank 120. If hose 190 is much longer than 150 feet, it becomes cost prohibitive. Hoses 190 may or may not be continuous, i.e., 30-50 foot lengths may be connected together by connectors to achieve the 150 foot total length. The sections may be connected using hydraulic connectors. Each section of hose may include a plurality of sensors (e.g., 191, 192) which extend back to the control panel 200. In addition, all sections of hose are preferably jacketed in a common jacket 193. The preferred jacket 193 is a rugged Nylon cover. Hoses 160 and 190 are preferably about 3-4 inches in diameter.

The spray guns 180 are also temperature controlled and preferably are capable of being heated to temperature of about 250° F. to about 450° F. Each spray gun 180 will also include an RTD sensor 184 as well as having heating elements 186 for heating the liquid top coating if the temperature drops below the preferred range. The spray guns 180 will also preferably include RTD sensors 184 to monitor the temperature of the liquid top coating passing through the guns 180.

The gun body 188 is preferably made of an aluminum block design and includes a heater cartridge 186 built into it. The spray gun 180 is also preferably jacketed at 189 to allow the handling of the gun without being burned by the high temperatures needed to maintain the finishing material viscosity of the top coat. The spray gun 180 like the other equipment preferably includes connections to the control panel for monitoring temperature and for controlling the heat cartridge 186 in the spray guns 180 to maintain the temperature of the top coating.

As previously mentioned, it is important that the liquid does not become static. The liquids from the pumps 171 to the spray guns 180 through hoses 190 are placed under pressure. The stirring in the day tank 120 prevents the metal compounds in the anti-fouling composition from precipitating out of the liquid. After the liquid leaves the day tank 120 and passes to the pump stands 170 and then to the spray guns 180, the mechanical shearing of the flow of the liquid through the hoses 160, 190, pump 171 and spray guns 180 prevents the metal compounds in the anti-fouling mixture from precipitating out.

All of the equipment is preferably connected to central control panel 200 which controls all of the equipment including the temperatures of the liquid and each piece of equipment. All of the equipment preferably includes temperature sensors (e.g., 111, 112, 124, 174, 184, 191, 192) that detect the temperature of the liquid in a particular piece of equipment. The temperatures may then be sent to the control panel 200 or other automated system that can adjust the heating elements in each piece of equipment to maintain the desired temperature of liquid top coating. This type of automatic heating helps control the viscosity balance of the liquid.

In addition, all of the equipment may be preferably mounted on a skid 208 which allows it to be moved from one location to another. This allows the system to be mobile. For example, in one preferred embodiment the drum unloader 105 and day tank 120 may be supported on a platform 210 that is approximately 4 feet by 4 feet. In another embodiment, the application system may be mounted on a flat bed oilfield truck or other vehicle for mobility.

Thus, another preferred embodiment for applying a thermoplastic coating comprises heating the thermoplastic mixture to maintain said mixture as a liquid, agitating said liquid, and applying said agitated liquid to a surface that has been previously coated with a tie coat. The agitated liquid is applied to the tie coat within 12 hours of the tie coat being deposited. Application of the agitated liquid is preferably achieved by spray coating.

There are shown specific embodiments of the present invention with the understanding that the present disclosure is to be considered an exemplification of the principles of the invention, and is not intended to limit the invention to that illustrated and described herein. Various dimensions, sizes, quantities, volumes, rates, and other numerical parameters and numbers have been used for purposes of illustration and exemplification of the principles of the invention, and is not intended to limit the invention to the numerical parameters and numbers illustrated, described or otherwise stated herein.

While a preferred embodiment of the invention has been shown and described, modifications thereof can be made by one skilled in the art without departing from the spirit of the invention.

The invention claimed is:

1. A method for applying a thermoplastic anti-fouling coating onto a marine surface, the method comprising:
   (a) depositing a tie coat comprising both a polyamine curing agent and a resin onto the marine surface under ambient conditions, wherein the tie coat has a time for complete curing, and is fluid at ambient temperature;
   (b) heating a thermoplastic, anti-fouling material that is solid at ambient temperature to a temperature greater than 250° F., at which the material has the viscosity of a finishing material, wherein the thermoplastic, anti-fouling material comprises rosin as a binding ingredient and at least one toxic agent;
   (c) spraying the heated thermoplastic material from (b) at a spraying-temperature in the range of from 250° F. to 450° F. onto said tie coat within said time for complete curing; and
   (d) allowing the tie coat to cure completely and allowing the sprayed material from (c) to cool and harden, thereby forming a top coat having a thickness greater than the thickness of the tie coat.

2. The method of claim 1 wherein the resin comprises a bisphenol-A type resin.

3. The method of claim 1 wherein the tie coat is a two-part epoxy consisting essentially of the resin and the polyamine curing agent.

4. The method of claim 1 wherein the tie coat and top coat form a bond at the interface thereof.

5. The method of claim 4 wherein the bond consists primarily of hydrogen bonding.

6. The method of claim 1 wherein the tie coat thickness is less than or equal to about 5 mils.

7. The method of claim 1 wherein the thermoplastic, anti-fouling material further comprises at least one component selected from the group consisting of viscosity reducing agents, metallic soaps, and suspension enhancing agents.

8. The method of claim 1 wherein the top coat is substantially 100% solids at ambient temperature.

9. The method of claim 8 wherein the average leach rate of the at least one toxic agent from the coated surface when the surface is submersed in water is less than 10 μg/cm$^2$/day.

10. The method of claim 1 wherein the top coat thickness is in the range of from 20 to 30 mils.

11. The method of claim 1 wherein the tie coat thickness is in the range of from 3 to 5 mils.

12. The method of claim 1 wherein the total thickness of the tie coat and top coat is in the range of from 23 to 25 mils.

13. The method of claim 1 wherein the top coat comprises greater than about 75% solids at ambient temperature.

14. The method of claim 1 wherein the top coat comprises less than or equal to 2% volatile organic compounds.

15. The method of claim 1 wherein the surface is at least a portion of the hull of a ship comprising a material selected from metal, wood, concrete, composites, tile, foam, fiberglass, PVC, plastic, and combinations thereof.

16. The method of claim 1 wherein the at least one toxic agent comprises metal compounds, and wherein the metal compounds are maintained suspended within the top coat during the finishing stage.

17. The method of claim 1 wherein the heated thermoplastic material does not become static at any point prior to application of the top coat to the tie coat.

18. A method for applying an anti-fouling coating onto a marine surface, the method comprising:
   (a) applying a two-part liquid epoxy comprising both a polyamine curing agent and a resin to the marine surface at ambient temperature, and allowing the epoxy to partially cure to produce a primed marine surface having coated thereon a tie coat;
   (b) heating a thermoplastic anti-fouling mixture which is solid at ambient temperature and comprises at least one metal compound and a rosin binder to a temperature greater than 250° F., at which the solid melts, thus producing a heated liquid antifouling mixture having the viscosity of a finishing material;
   (c) agitating said heated liquid antifouling mixture sufficiently to maintain homogeneity;
   (d) applying said heated agitated liquid from (c) to the primed marine surface; and
   (e) allowing the tie coat to cure completely and allowing the applied heated agitated liquid from (d) to cool, thereby forming a top coat having a thickness greater than the thickness of the tie coat.

19. A method of anti-fouling a metal structure for disposal in water, the method comprising:
   providing a clean surface on the metal structure;
   applying a tie coat to the metal surface, wherein the tie coat consists essentially of a polyamine curing agent and a bisphenol-A type resin and is fluid at ambient temperature; and
   applying a top coat comprising a thermoplastic anti-fouling material to the tie coat prior to complete curing of the tie coat, wherein the thermoplastic anti-fouling material is a solid at ambient temperature and is heated to a temperature greater than 250° F. at which the thermoplastic anti-fouling material has the viscosity of a finishing material prior to application, wherein the thermoplastic anti-fouling material comprises a wax as viscosity reducer, a rosin binder, a metallic soap, a toxic agent comprising a metal, and a suspension enhancing agent.

20. The method of claim 19 wherein the top coat is applied to the tie coat at a higher temperature than the temperature at which the tie coat is applied to the marine surface, thereby increasing the curing rate of the tie coat and the rate of hardening.

21. A method for applying a thermoplastic anti-fouling coating onto a marine surface, the method comprising:
   depositing a tie coat comprising both a polyamine curing agent and a resin onto the marine surface under ambient conditions, wherein the tie coat has a time for complete curing, and is a liquid at ambient temperature; and
   prior to said time for complete curing:
   (a) heating a solid thermoplastic, anti-fouling material comprising a rosin binder and a toxic agent to a first temperature, wherein the first temperature is a temperature of greater than 250° F., and wherein the anti-fouling material has the viscosity of a finishing material at the first temperature;
   (b) introducing the heated thermoplastic material from (a) into a liquids processing assembly configured for continuously agitating the heated thermoplastic material and maintaining the heated thermoplastic material at a second temperature greater than the first temperature, providing a heated, agitated thermoplastic material;
   (c) pumping the heated, agitated thermoplastic material from the liquids processing assembly in (b) to a finishing assembly comprising at least one liquid applicator assembly comprising a pump and a spray gun heatable to a temperature in the range of from about 250° F. to about 450° F., whereby the heated, agitated thermoplastic material from (b) is sprayed, at a spraying-temperature in the range of from about 250° F. to about 450° F., onto said tie coat,
   wherein the temperature of the thermoplastic material is controlled throughout (a), (b) and (c) prior to spraying; and
   allowing the tie coat to cure and allowing the sprayed material from (c) to cool and harden, thereby forming a top coat having a thickness greater than a thickness of the cured tie coat.

* * * * *